United States Patent
Bramley, Jr.

(10) Patent No.: US 6,889,340 B1
(45) Date of Patent: May 3, 2005

(54) USE OF EXTRA FIRMWARE FLASH ROM SPACE AS A DIAGNOSTIC DRIVE

(75) Inventor: Richard A. Bramley, Jr., Mansfield, MA (US)

(73) Assignee: Phoenix Technologies Ltd., Milpitas, CA (US)

( * ) Notice: Subject to any disclaimer, the term of this patent is extended or adjusted under 35 U.S.C. 154(b) by 502 days.

(21) Appl. No.: 09/687,007

(22) Filed: Oct. 13, 2000

(51) Int. Cl.$^7$ .............................................. G06F 11/00
(52) U.S. Cl. ................................ 714/6; 714/30; 714/36
(58) Field of Search ................................ 714/5, 25, 30, 714/36, 6

(56) References Cited

U.S. PATENT DOCUMENTS

| | | | | |
|---|---|---|---|---|
| 5,245,615 A | * | 9/1993 | Treu ............................. | 714/45 |
| 5,530,847 A | * | 6/1996 | Schieve et al. ................ | 714/38 |
| 5,844,986 A | * | 12/1998 | Davis .......................... | 713/187 |
| 5,887,131 A | * | 3/1999 | Angelo ........................ | 713/202 |
| 6,006,344 A | * | 12/1999 | Bell, Jr. ....................... | 714/37 |
| 6,009,540 A | * | 12/1999 | Craft et al. ................... | 714/30 |
| 6,189,114 B1 | * | 2/2001 | Orr ............................. | 714/25 |
| 6,393,586 B1 | * | 5/2002 | Sloan et al. ................... | 714/25 |
| 6,449,735 B1 | * | 9/2002 | Edwards et al. .............. | 714/25 |

\* cited by examiner

*Primary Examiner*—Nadeem Iqbal
*Assistant Examiner*—Timothy M. Bonura

(57) ABSTRACT

A method 20 and computer apparatus for using available firmware flash ROM space as a diagnostic drive. The computer apparatus has a nonvolatile random access memory, an Extensible Firmware Interface (EFI) and a basic input and output system (BIOS). To implement the functionality provided by the present invention, a command shell of the EFI is modified to include the EFI driver and operates to configure available flash space normally reserved for firmware (BIOS) as a diagnostic disk drive. The modified EFI and the EFI driver are stored in the flash memory. When the computer system 10 is initialized (booted), the EFI driver configures the available space in the flash memory that is not allocated to the firmware as the diagnostic disk drive. Diagnostic programs are loaded into the diagnostic disk drive, which are selectively run by a user, such as by using the command shell. The method may also be configured to include data compression and decompression routines to increase the quantity of data that may be stored in the configured disk drive space, or encryption routines for security purposes. The diagnostic disk drive space may be used to store power on self test (POST) error logs in files that may be read by the operating system during its boot process and displayed by an event viewer.

14 Claims, 2 Drawing Sheets

USE OF EXTRA FIRMWARE FLASH ROM SPACE AS A DIAGNOSTIC DRIVE

BACKGROUND

The present invention relates generally to computer systems and methods, and more particularly, to a system and method that provides for the use of available firmware flash ROM space as a diagnostic drive.

The assignee of the present invention develops firmware known as a basic input and output system, or BIOS that is employed in variously available computer systems. The BIOS is a firmware program that is typically stored in a nonvolatile random access memory (or flash memory). The BIOS brings up the computer system when it is turned on.

On IA-64 computer systems, manufactured by Intel, for example, 16 MB of address space has been reserved for flash ROM storage of the firmware (BIOS). The firmware developed by the assignee of the present invention may be adapted to fit within about 4 MB of disk space, leaving about 12 MB free (if the OEM populates the chips).

There are numerous patents disclosing how to implement read only memory technology as a disk drive. However, there are no patents that disclose or suggest the use of the extra firmware flash ROM as a disk drive containing diagnostics.

It is an objective of the present invention to use this available flash ROM storage space in a manner not heretofore done in the computer industry. It is an objective of the present invention to provide for a system and method that provides for the use of available firmware flash ROM space as a diagnostic drive.

SUMMARY OF THE INVENTION

To accomplish the above and other objectives, the present invention provides for system and method that provides for the use of available firmware flash ROM space as a diagnostic drive. The present invention is employed on a computer system that includes a central processing unit and a nonvolatile random access memory. The computer system has an Extensible Firmware Interface, which is a ROM-based operating system stored in the nonvolatile random access memory that provides disk operating system (DOS) functionality for the computer system. The Extensible Firmware Interface is controlled by the basic input and output system and executes before any other operating systems are loaded or disk access is allowed.

The general purpose of the present invention is to use the unused ROM space in flash memory available on a server or other computer system as a hard drive that stores diagnostic programs and data. Using available flash ROM space means that there isn't any way to lose the diagnostic programs or to run them with the wrong operating system.

As mentioned above, in IA-64 systems, 16 MB of address space is reserved for flash ROM storage of firmware. The firmware created by the assignee of the present invention fits easily within about 4 MB of disk space, leaving about 12 MB free for use as a diagnostic drive (if the OEM populates the chips).

A preferred embodiment of the present invention contemplates that the use of an Extensible Firmware Interface (EFI) driver that allows the flash-based storage area to appear as a standard block device (a hard disk drive, for example) that is selectable from the command shell (which is part of the Extensible Firmware Interface). The EFI provides DOS (Disk Operating System) functionality. The EFI is controlled by the BIOS of the computer system and executes before any other operating systems are loaded or disk access is allowed.

The Extensible Firmware Interface has a command shell, which is the outermost layer or user interface of this program, and which has a command processor interface. The command processor is a program that executes operating system commands. The command shell is that part of the command processor that accepts commands. After verifying that the commands are valid, the shell sends them to another part of the command processor to be executed.

It may also be desirable to build data compression and decompression support directly into the EFI driver to increase the quantity of data that may be stored. The diagnostic drive may also be used to store power on self test (POST) error logs in files that may be read by the operating system during its boot process and displayed by an event viewer. The diagnostic drive may also be configured to support encryption for security purposes.

While it is possible to provide drivers for various operating systems used in available computer systems (DOS, NT, Win9x, etc.) these are less interesting because it is expected that the majority of new diagnostics will be written as EFI applications that can be run from the EFI command shell. By providing access as an EFI drive, the computer platform does not require a functional mass storage device to run the diagnostics. As EFI applications, an operating system is also not needed for its operation and there is no possibility for the diagnostics to be run on the wrong operating system.

Since the firmware is structured as a number of discrete binary images residing in flash ROM, these could also be located as files on the diagnostic drive. This makes it easy to update the firmware, by simply copying a new file to the diagnostic drive. Using this aspect of the present invention, a change in a disk driver would support loading binary images from a standard hard disk or from a server processor across a network or serial link.

An exemplary method in accordance with the present invention is used with a computer system that includes a central processing unit, a nonvolatile random access memory, an Extensible Firmware Interface (EFI), and a basic input and output system. The method comprises the following steps. An Extensible Firmware Interface (EFI) driver is added which allows the unused flash-based storage area to appear as a standard block device (a hard disk drive, for example) that is selectable from the command shell (which is part of the Extensible Firmware Interface). Diagnostic programs are stored in unused memory space of the nonvolatile random access memory which are accessible via the Extensible Firmware Interface. If the computer fails to boot its operating system due to a problem with the hard disk drive, a user boots the system to the EFI command shell and the user runs a diagnostic program from the diagnostic drive. The program finds the error and corrects it. The user then reboots the computer system which successfully boots the operating system on the hard disk drive.

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and in which.

DETAILED DESCRIPTION

Figure 1:
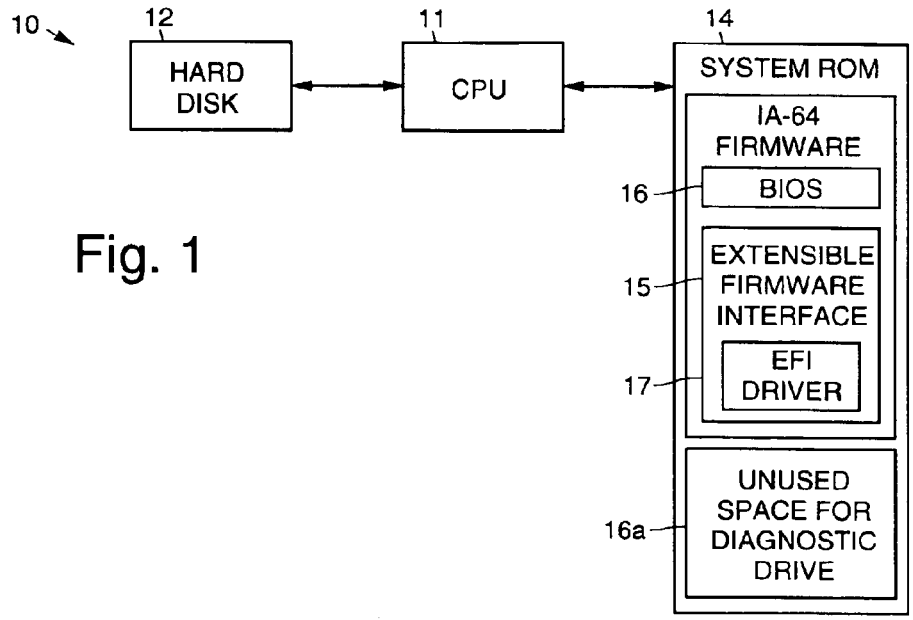
FIG. 1 illustrates an exemplary computer system in which the present invention is employed.

Referring to the drawing figures, FIG. 1 illustrates an exemplary computer system 10 in which the present invention may be employed. The computer system 10 comprises a central processing unit (CPU) 11 which is coupled to a hard disk drive 12 and a nonvolatile random access memory (NVRAM) 14, also known as flash memory 14. A hard disk drive 12 is shown as part of the system 10, which is typically the case, although one is not necessarily required.

The computer system 10 also comprises a basic input and output system (BIOS) 16, which is stored in the flash memory 14. As will be discussed below, the BIOS 16 is stored in a relatively small portion of the flash memory 14. The computer system 10 also comprises an Extensible Firmware Interface (EFI) 15 which is a ROM-based operating system that is stored in the flash memory 14 that provides disk operating system (DOS) functionality for the computer system 10. The Extensible Firmware Interface 15 is controlled by the BIOS 16 and executes before any other operating systems are loaded or disk access is allowed.

The Extensible Firmware Interface 15 comprises a command shell, which is the outermost layer or user interface of this program, and which has a command processor interface. The command processor is a program that executes operating system commands. The command shell is that part of the command processor that accepts commands. After verifying that the commands are valid, the shell sends them to another part of the command processor to be executed.

Figure 2:
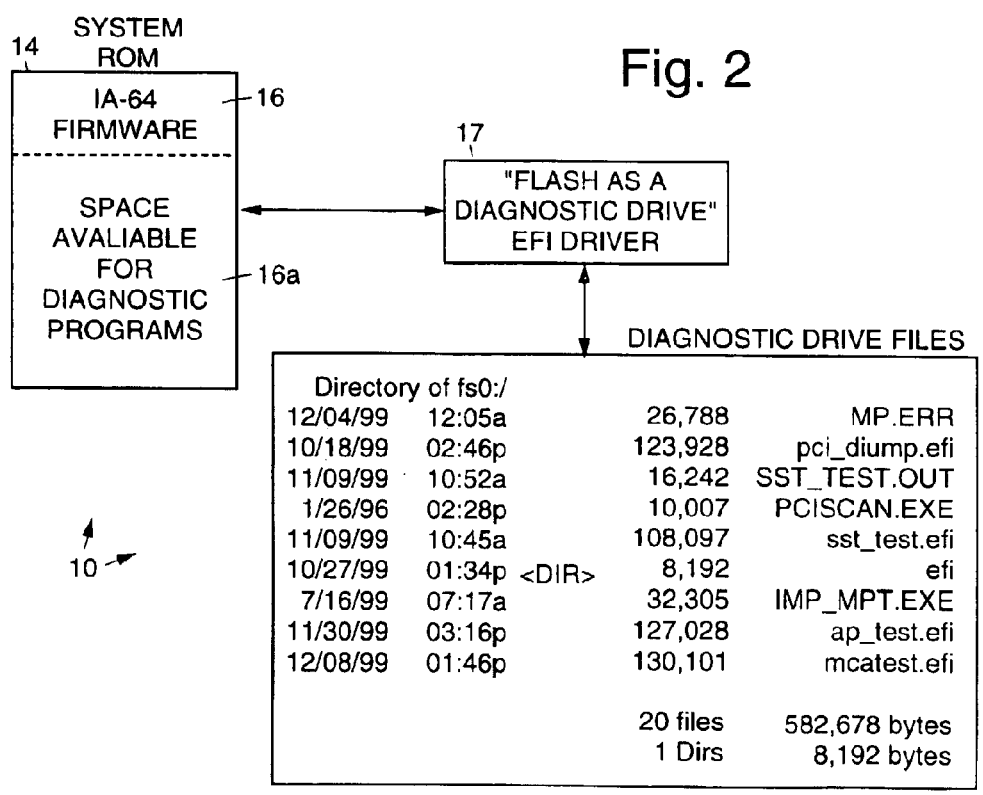
FIG. 2 illustrates details of the present invention.

An EFI device driver 17 is an application that is written to run under the Extensible Firmware Interface 15. The specific EFI device driver 17 employed in the present invention may be referred to as a "flash as a diagnostic drive" EFI driver 17 as is illustrated in FIG. 2. There are typically many EFI drivers that are used, including one to handle a video display, one for a keyboard, one for the serial ports, and so forth.

The BIOS 16 brings up the computer system 10 when it is turned on. The BIOS 16 determines what the computer can do without accessing programs from the hard disk 12 or other media. The BIOS 16 contains code required to control the keyboard, display screen, disk drives, serial communications, for example, along with certain other functions, depending upon the computer system 10.

A preferred embodiment of the present invention uses the EFI driver 17 to configure the available portion of the flash-based storage area (drive space 16a of the flash memory 14) to appear as a standard block device (a hard disk drive, for example). Diagnostic programs are loaded into the configured disk drive space 16a of the flash memory 14. The block device configured by the EFI driver 17 is selectable by a boot manager that is part of the BIOS 16.

The "diagnostic drive" portion of the flash memory 14 may be used when the computer system 10 is booted, and the EFI device driver 17 makes the unused part of the flash ROM space appear as a block device (e.g., a hard drive). If the driver 17 had not been loaded before, this space appears as an empty hard drive. The manufacturer or user of the computer system 10, copies the diagnostic programs onto this "hard drive". At this point if the computer system 10 were turned off then back on, these diagnostic programs would still be stored in the drive. When the user encountered problems with the computer system 10, the command shell could be loaded and this "hard drive" with the diagnostic programs could then be accessed to diagnose and remedy the problem.

Referring to FIG. 2, it illustrates details involved in implementing the present invention. In a typical IA-64 computer system 10, 16 MB of address space is reserved for storage of firmware in the flash memory 14. The firmware created by the assignee of the present invention fits easily within about 4MB of disk space, which, in the case of the IA-64 computer system 10, leaves about 12 MB free for use as a diagnostic drive (if the OEM populates the chips).

The unused space in the flash memory 14 is controlled by the EFI driver which configures this portion 16a of the flash memory 14 to function like a conventional disk drive (such as the hard disk drive 12 shown in FIG. 1). Diagnostic programs are then loaded into the configured disk drive space 16a of the flash memory 14 and is controlled by the BIOS 16 by way of the EFI driver 17.

The EFI driver 17 may also be configured to support data compression and decompression in a conventional manner. This will increase the quantity of data that may be stored in the configured disk drive space 16a of the flash memory 14. The diagnostic disk drive space 16a may also be used to store power on self test (POST) error logs in files that may be read by the operating system during its boot process and displayed by an event viewer. The diagnostic drive may also be configured to support encryption for security purposes. An example of what files might exist on the diagnostic drive and how they might appear in the command shell is shown in the large display box at the lower portion of FIG. 2.

Figure 3:
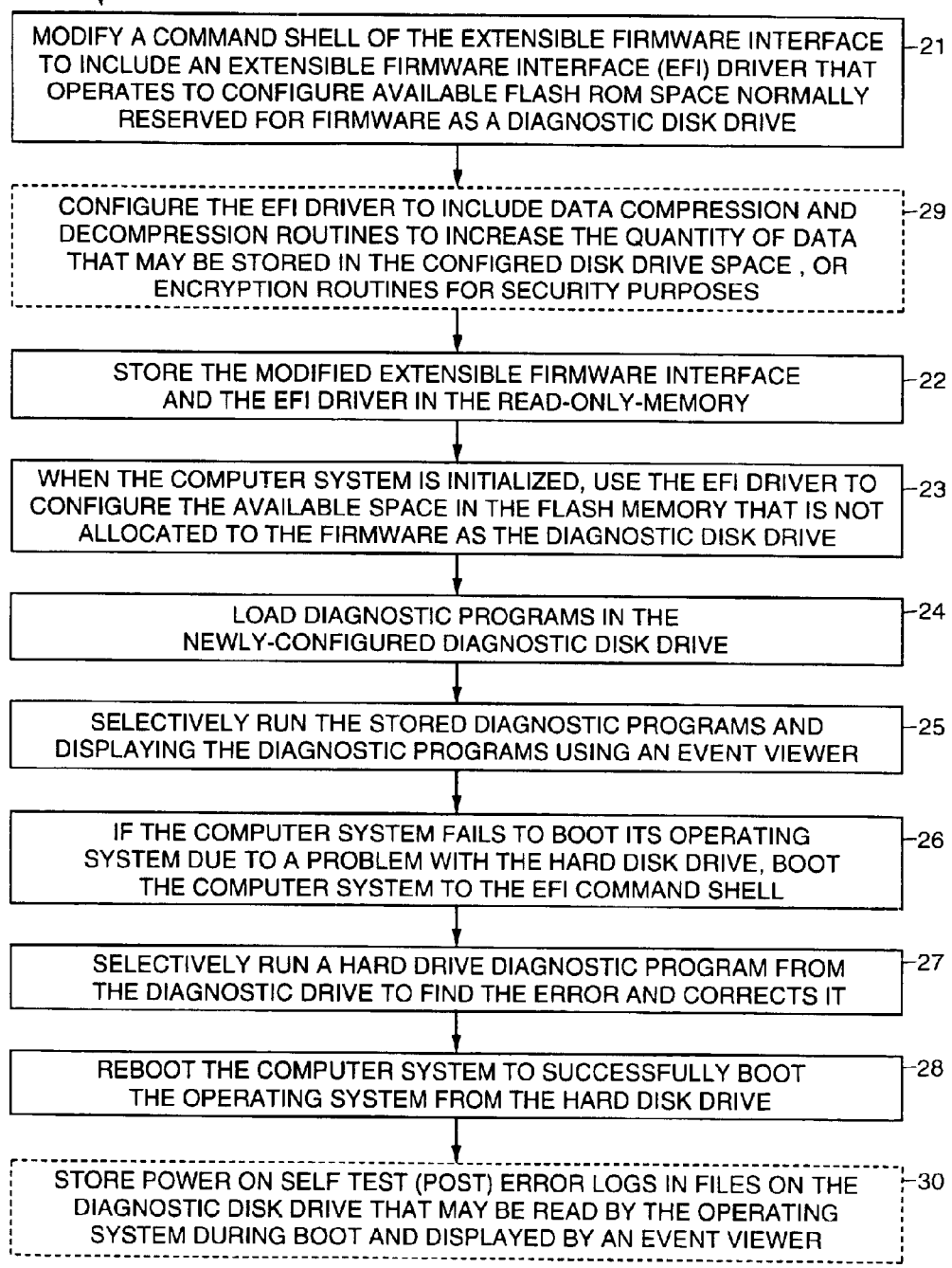
FIG. 3 is a flow diagram that illustrates an exemplary method in accordance with the principles of the present invention for using the unused space of a flash memory as a hard disk drive to store diagnostic programs and data.

FIG. 3 is a flow diagram that illustrates an exemplary method 20 in accordance with the principles of the present invention for using unused space of a flash memory 14 as a hard disk drive 16a to store diagnostic programs and data. The method 20 is used with a computer system 10 having a central processing unit (CPU) 11, a nonvolatile random access memory (NVRAM) 14 or flash memory 14, a basic input and output system (BIOS) 16, and an Extensible Firmware Interface 15.

The method 20 comprises software 20, and preferably firmware 20, implemented using an EFI driver 17 that is stored and executed from the flash memory 14. The method 20 comprises the following steps. A command shell of the Extensible Firmware Interface 15 is modified 21 to include the EFI driver 17 that operates to configure available flash ROM space normally reserved for firmware (BIOS) 16 as a diagnostic disk drive 16a. The modified Extensible Firmware Interface 15 and the EFI driver 17 are stored 22 in the flash memory 14.

When the computer system 10 is initialized (booted), the EFI driver 17 configures 23 the available space in the flash memory 14 that is not allocated to the firmware 16 as the diagnostic disk drive 16a. One or more diagnostic programs are loaded 24 into the diagnostic disk drive 16a, which are selectively run 25 by a user, such as by using the command shell if the computer system 10 has a problem with the hard disk drive 16a.

If the computer system 10 fails to boot its operating system due to a problem with the hard disk drive 12, a user selectively boots 26 the computer system to the EFI command shell. The user selectively runs 27 one or more hard drive diagnostic program from the diagnostic drive 16a. The diagnostic program finds the error and corrects it. The user then reboots 28 the computer system 10 which successfully boots the computer system from the hard disk drive 12.

The software or firmware that implements the method 20 may also be configured 29 to include data compression and decompression routines, or encryption routines for security purposes. The data compression and decompression routines increase the quantity of data that may be stored in the configured disk drive space 16a of the flash memory 14. The diagnostic disk drive space 16a may be used to store 30 the POST error logs in files that may be read by the operating system during its boot process and displayed by an event viewer.

Thus, system and method that provides for the use of available firmware flash ROM space as a diagnostic drive have been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A method for using available firmware flash ROM space as a diagnostic drive of a computer system that includes a central processing unit, a hard disk drive, a nonvolatile random access memory, and Extensible Firmware Interface (EFI), and a basic input and output system, the method comprising the steps of:

modifying the Extensible Firmware Interface to include and EFI driver that operates to configure available nonvolatile random access memory space normally reserved for the BIOS as a diagnostic disk drive;

storing the modified Extensible Firmware Interface and the EFI driver in the nonvolatile random access memory;

when the computer system is initialized, configuring the available space in the flash memory that is not allocated to the firmware as a diagnostic disk drive;

loading one or more diagnostic programs into the diagnostic disk drive;

selectively booting the computer system to the EFI command shell in the event of a problem with the computer system;

running the one or more diagnostic programs to correct the problem with the computer system; and rebooting the computer system using the operating system on the hard disk drive.

2. The method recited in claim 1 wherein the modifying, storing, configuring, loading, selectively booting, running and rebooting steps are performed in software.

3. The method recited in claim 1 wherein the modifying, storing, configuring, loading, selectively booting, running and rebooting steps are performed in firmware.

4. The method recited in claim 1 wherein the step of running the one or more diagnostic programs comprises displaying the diagnostic programs using an event viewer.

5. The method recited in claim 1 further comprising the step of configuring the EFI driver to include data compression and decompression routines to increase the quantity of data stored in the diagnostic disk drive.

6. The method recited in claim 1 further comprising the step of configuring the EFI driver to include encryption routines for security purposes.

7. The method recited in claim 1 wherein the diagnostic disk drive space is used to store power on self test (POST) error logs in files that may be read and displayed.

8. The method recited in claim 7 wherein the POST error logs in files are read by the operating system during its boot process and are displayed by an event viewer.

9. A computer apparatus, comprising:

a central processing unit;

a nonvolatile random access memory;

an Extensible Firmware Interface (EFI);

a basic input and output system (BIOS) stored in the nonvolatile random access memory; and and EFI driver stored in the nonvolatile random access memory that interfaces with the Extensible Firmware Interface, and operates to configure available flash read-only-memory space normally reserved for the BIOS as a diagnostic disk drive, load one or more diagnostic programs into the diagnostic disk drive, selectively boot the computer system to the EFI command shell in the event of a problem with the hard disk drive, run the one error or more diagnostic programs to correct the problem with the hard disk drive, and reboot the computer system using the operating system on the hard disk drive.

10. The computer apparatus recited in claim 9 which further comprises an event viewer for displaying the diagnostic programs.

11. The computer apparatus recited in claim 9 wherein the EFI driver includes data compression and decompression routines to increase the quantity of data stored in the diagnostic disk drive.

12. The computer apparatus recited in claim 9 wherein the EFI driver includes encryption routines for security purposes.

13. The computer apparatus recited in claim 9 wherein the diagnostic disk drive stores power on self test (POST) error logs in files that may be read and displayed.

14. The computer apparatus recited in claim 13 wherein the POST error logs in the files read by operating system during its boot process and are displayed by an event viewer.

* * * * *